April 29, 1969     B. A. McCLELLAN     3,440,757
ELONGATED FLEXIBLE ARTIFICIAL LURE FOR LARGE FISH
Filed April 12, 1967
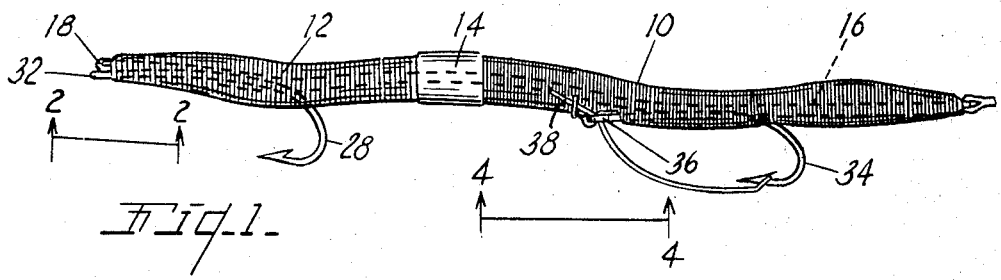
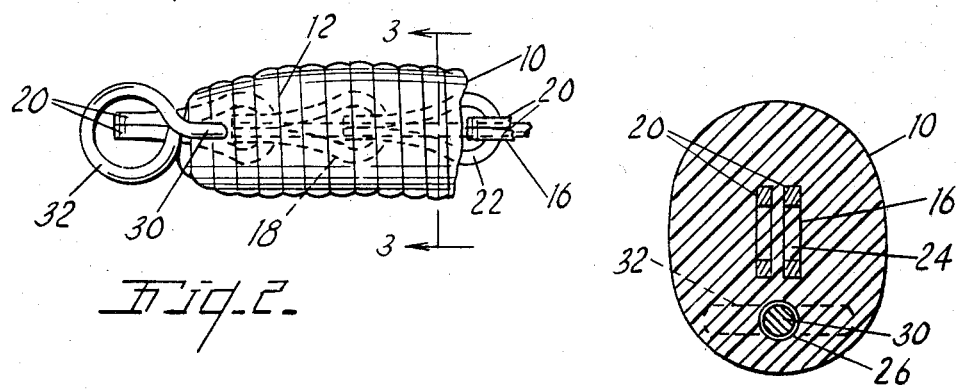
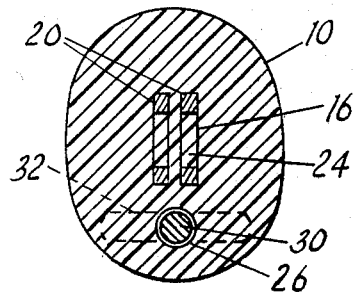
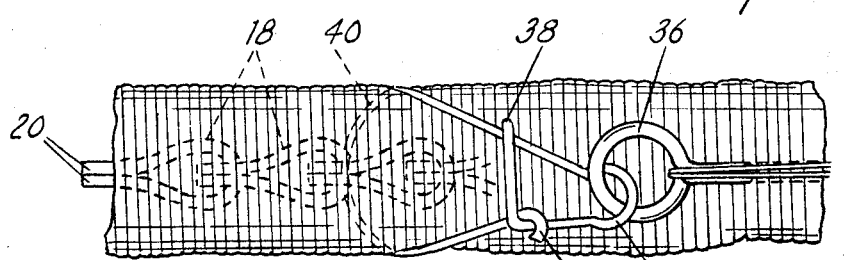
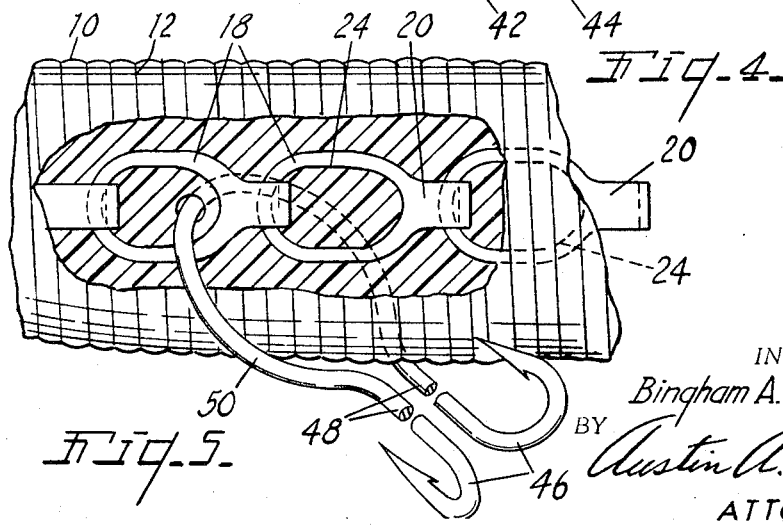
INVENTOR.
Bingham A. McClellan
BY Austin A. Webb
ATTORNEY.

3,440,757
ELONGATED FLEXIBLE ARTIFICIAL LURE FOR
LARGE FISH
Bingham A. McClellan, Traverse City, Mich., assignor to
Burke Flexo-Products Company, Traverse City, Mich.
Filed Apr. 12, 1967, Ser. No. 630,262
Int. Cl. A01k 85/00
U.S. Cl. 43—42.24                                    3 Claims

ABSTRACT OF THE DISCLOSURE

An elongated worm or eel-like body of synthetic plastic with metal chain having universally swingably connected links molded within, and surrounded by the plastic of the body. The end links project from the body. Hook and tackle connecting attachments pierce completely through the plastic of the bdoy and extend through links of the chain for mechanical support by the chain. The hooks extend longitudinally of the body through passages within the body and are supported against lateral movement.

Summary of invention

Elongated bodies of worm or eel simulating shape are molded from synthetic plastic, around a continuous metal chain, with molded plastic material extending integrally through openings in and between the links of the chain. The links of the chain are universally swingably connected to permit free flexing of the body while preventing the lure from being bitten in two by large fish. An end link of the chain is accessible at the end of the body for attachment to fishing line or leader. Tackle attaching clamps and hooks are selectively pierced through the plastic of the body to engage links of the chain or leader so that the stress created by a hooked fish is transmitted to the line, rather than by the plastic body. The chain may be bright metal and the plastic of the body may be transparent so that the chain reflects light to increase the visibility and effectiveness of the lure. The plastic of the body may be employed to yieldably position a hook in a selected position relative to the body, while the chain carries the load of a fish engaged by the hook.

Disclosure

The drawings, of which there is one sheet, illustrate a highly practical form of the lure, and one modified arrangement of tackle connection thereto.

FIGURE 1 is a side elevational view of a first form of the lure.

FIGURE 2 is an enlarged fragmentary bottom plan view of the lure as viewed from the line 2—2 in FIGURE 1.

FIGURE 3 is a cross sectional view taken along the plane of the line 3—3 in FIGURE 2.

FIGURE 4 is an enlarged bottom plan view of the portion of the lure indicated by the line 4—4 in FIGURE 1.

FIGURE 5 is a fragmentary bottom plan view, partially broken away in cross section, and showing an alternative hook or tackle connection to the lure.

The lure shown in FIGURES 1 to 4 has an elongated worm-like body 10 with external ribs or rings 12 and a smooth area 14 simulating the shape and surface of an angleworm or crawler. The body 10 is molded from synthetic plastic material to have a rubber-like flexibility. The plastic may be transparent or translucent and may be of different colors.

Extending longitudinally through the body is a link chain 16 having universally swingably connected links 18. The end links of the chain project through or are located closely adjacent the ends of the body. As appears in FIGURE 3, the plastic material of the body extends continuously and integrally through openings in and between the links of the chain. The particular chain illustrated has links formed from flat sheet metal with a pair of arms 20 folded to side by side position to form a rounded or looped bight 22. The arms have holes 24 for interconnection with the loop of the adjacent link. The chain has greater flexibility than a wire of comparable tensile strength, so the body is more flexible than one reinforced by wire.

In the example shown in FIGURES 1 to 4, a hole or passage 26 is pierced longitudinally through the bottom of the body, along the bottom of the chain, to the front end of the body. A hook 28 has its shank 30 pressed through the passage until the eye 32 of the hook is located adjacent the front link of the chain. In this position, a fish line, leader, or tackle connecting attachment (not illustrated) may be passed through both the eye 32 and the holes in the arms of the front link of the chain. In this way, the load or strain of a fish caught on the hook is transmitted directly to the line or leader, while the body of the lure engages the hook shank to hold the hook end in a desired position relative to the body.

Rearwardly of the hook 28, a second hook 34 is passed through a similar opening in the body with the eye 36 of the hook projecting from the bottom of the body. A tackle snap or connector 38 of springable wire has one loop 40 extending through the holes 24 in the arms of a selected chain link by piercing the springable end 42 through the body and the link. The other loop 44 is passed through the eye 36 to transmit loads from the hook to the chain.

The alternative, or additional, tackle attachment shown in FIGURE 5 consists of a pair of ganged hooks 46 having shanks 48 connected by a loop 50 of springable wire. The hooks are attached to the lure by spreading the loop and piercing one hook through the body and the openings 24 in a selected link 18. After the one hook is completely through the body, the loop springs towards a closed position to bring the shanks into side by side position outside of the body.

The snap 38 and loop ganged hooks 46 are examples only of possible ways of connecting hooks or other attachments to the body of the lure. In each instance, the hook or tackle element is engaged with the chain by piercing the plastic body at the point selected, either with a separate pointed tool, or with a sharp end on the tackle part.

What is claimed as new is:
1. A fishing lure comprising an elongated and relatively narrow body having a rounded cross section and formed of molded synthetic flexible plastic,
   a metal chain of universally swingably connected links extending along substantially the full length of said body with the plastic material of the body extending integrally and continuously through and between the links of the chain,
   a loop in one end of said chain being accessible exteriorly of said body,
   a hook having a shank and an eye,
   said eye being connected in tension transmitting relation to a link of said chain,
   wherein the connection between said eye and said chain comprises a connector,
   said connector having a loop with a springably free end,
   said loop being pierced substantially transversely and completely through the plastic of said body and through an opening in an intermediate link of said chain.
2. A lure as defined in claim 1 in which said con- nector has a second loop with a second springably free end passed through the eye of the hook externally of the body of the lure.

3. A lure as defined in claim 1 in which the shank of said hook extends longitudinally and is supported against lateral movement through a passage formed through the plastic of said body.

References Cited

UNITED STATES PATENTS

| | | | |
|---|---|---|---|
| 1,406,834 | 2/1922 | Fisher | 43—42.24 X |
| 2,316,048 | 4/1943 | Clarke | 43—42.24 X |
| 2,792,662 | 5/1957 | Norton | 43—42.24 |
| 3,147,564 | 9/1964 | Messler | 43—42.24 X |
| 3,148,474 | 9/1964 | Smith | 43—42.24 |
| 3,344,550 | 10/1967 | Peters | 43—42.24 X |
| 3,349,513 | 10/1967 | Jeff | 43—42.24 X |

SAMUEL KOREN, *Primary Examiner.*

J. H. CZERWONKY, *Assistant Examiner.*

U.S. Cl. X.R.

43—42.36